WILLIAM H. WHETSTONE.
Improvement in Hay and Cotton Presses.
No. 127,666.                  Patented June 4, 1872.
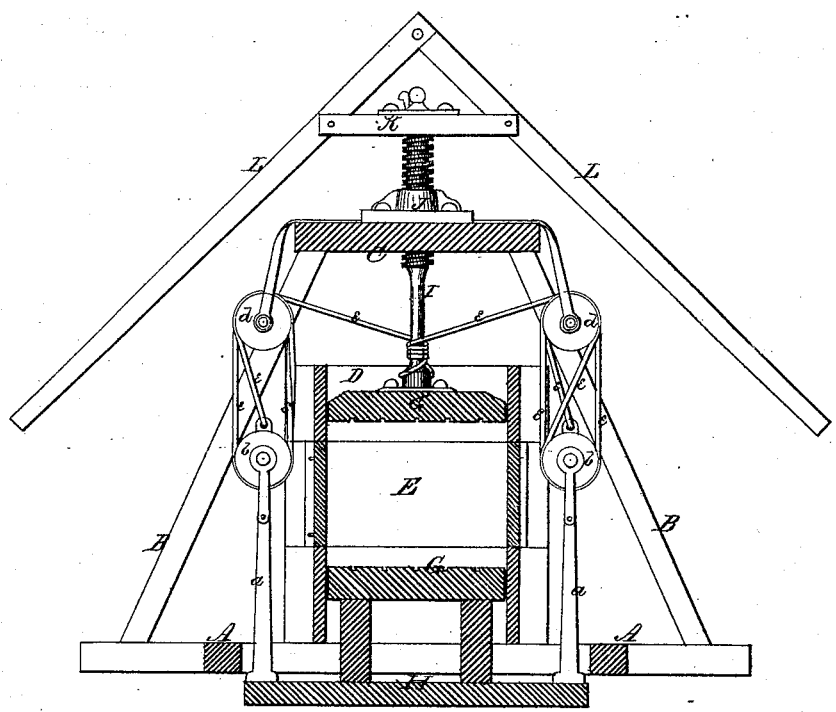

127,666

UNITED STATES PATENT OFFICE.

WILLIAM H. WHETSTONE, OF LOWNDESBOROUGH, ALABAMA.

IMPROVEMENT IN HAY AND COTTON PRESSES.

Specification forming part of Letters Patent No. 127,666, dated June 4, 1872.

SPECIFICATION.

*To all whom it may concern:*

Be it known that I, WILLIAM H. WHETSTONE, of Lowndesborough, in the county of Lowndes and State of Alabama, have invented certain new and useful Improvements in Hay and Cotton Press; and I do hereby declare that the following is a full, clear, and exact description thereof, reference being had to the accompanying drawing and to the letters of reference marked thereon which form a part of this specification.

The nature of my invention consists in the construction and arrangement of a "cotton-press," as will be hereinafter more fully set forth.

In order to enable others skilled in the art to which my invention appertains to make and use the same, I will now proceed to describe its construction and operation, referring to the annexed drawing, in which is represented a longitudinal section of my hay and cotton press.

A represents a frame, of any suitable dimensions, at each corner of which is an inclined post, B, said post supporting a top beam or cap, C. Upon the frame A, and between the inclined posts B B, is framed the bale-box D, having horizontally-opening doors E in the center. The bottom of the bale-box D is formed of a movable follower, G, fitting within the lower part of the box and attached to a bar, H, underneath, from the ends of which project metal bars $a$ $a$, having each a pulley, $b$, at its upper end. Ropes or chains $e$ $e$ attached to the bars $a$ $a$ pass around the pulleys $b$ $b$, and also around pulleys $d$ $d$ placed on shafts or rods on the posts B B, and braced from the top cap C. The other ends of the ropes or chains $e$ $e$ are attached to an upright shaft, I, which is provided with screw-threads around its upper end for a suitable distance downward, and passes through the center of the top cap C, and through a nut, J, secured on top of said cap. On the upper end of the screw-shaft I is keyed a bar, K, to which are attached levers L L, connected at the upper ends, forming an inverted V, and by means of which the screw is turned. To the lower end of the shaft I is attached the top follower G' in the usual manner.

It will be seen that, as the follower G' is moved downward by the turning of the screw-shaft I, the ropes or chains $e$ $e$ become wound around the lower part of said shaft, pulling the bottom follower G upward, thus pressing the bale both from the top and bottom.

Having thus fully described my invention, what I claim as new, and desire to secure by Letters Patent, is—

1. The combination of the screw-shaft I, chains or ropes $e$ $e$, pulleys $d$ $d$ and $b$ $b$, bars $a$ $a$ and H, and followers G G', all constructed and arranged substantially as and for the purposes herein set forth.

2. The combination of the frame A B C, box D with central doors E, followers G G', screw-shaft I, ropes $e$ $e$, nut J, bar K, and levers L, all constructed and arranged to operate substantially as and for the purposes herein set forth.

In testimony that I claim the foregoing as my own, I affix my signature in presence of two witnesses.

W. H. WHETSTONE.

Witnesses:
 J. P. WILSON,
 O. J. GRESHAM,
 C. E. REESE.